United States Patent
Ichikawa et al.

(10) Patent No.: US 11,648,840 B2
(45) Date of Patent: May 16, 2023

(54) POWER CONVERSION DEVICE AND MOTORIZED VEHICLE USING SAME

(71) Applicant: Mitsubishi Electric Corporation, Tokyo (JP)

(72) Inventors: Takafumi Ichikawa, Tokyo (JP); Masahiro Iezawa, Tokyo (JP); Noriyuki Wada, Tokyo (JP); Kotaro Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 542 days.

(21) Appl. No.: 16/725,423

(22) Filed: Dec. 23, 2019

(65) Prior Publication Data

US 2020/0324656 A1 Oct. 15, 2020

(30) Foreign Application Priority Data

Apr. 15, 2019 (JP) .............................. JP2019-076868

(51) Int. Cl.
*B60L 50/51* (2019.01)
*B60L 15/02* (2006.01)
(Continued)

(52) U.S. Cl.
CPC ............ *B60L 50/51* (2019.02); *B60K 7/0007* (2013.01); *B60L 15/025* (2013.01); *B60L 50/13* (2019.02);
(Continued)

(58) Field of Classification Search
CPC ........ B60L 50/51; B60L 15/025; B60L 50/13; B60L 50/15; B60K 7/0007; H02P 21/20; H02P 29/02; H02P 27/08; H02P 21/22; H02P 21/0003; H02P 21/06; H02P 21/14; H02J 7/0013; H02J 7/00; H02J 7/0018; H02J 7/0014; H02J 7/0024; H02J 2207/20;
(Continued)

(56) References Cited

U.S. PATENT DOCUMENTS 9,297,676 B2 * 3/2016 Kato .................. H02K 11/20
2009/0243522 A1 10/2009 Suhama et al.
(Continued)

FOREIGN PATENT DOCUMENTS

| JP | 2004215320 A | * | 7/2004 | ............ B60L 15/025 |
| JP | 2007-151336 A | | 6/2007 | |
| JP | 2007181358 A | * | 7/2007 | |

*Primary Examiner* — Elim Ortiz
(74) *Attorney, Agent, or Firm* — Sughrue Mion, PLLC; Richard C. Turner

(57) ABSTRACT

There has been a drawback in that current command values need to be set for a current command unit of a power conversion device in accordance with efficiency, and thus the number of operation steps increases. In the power conversion device connected between a three-phase AC rotating machine and a DC power supply and configured to convert DC power into AC power, a DC voltage value, of the DC power supply, that is to be inputted to a current command unit of the power conversion device is corrected on the basis of an efficiency index, and a current command value to be outputted by the current command unit is changed on the basis of the corrected DC voltage value and a torque command value, whereby the efficiencies of the power conversion device and the three-phase AC rotating machine are controlled.

9 Claims, 6 Drawing Sheets

(51) Int. Cl.
  *B60L 50/13* (2019.01)
  *H02P 21/20* (2016.01)
  *H02P 29/02* (2016.01)
  *B60K 7/00* (2006.01)
  *B60L 50/15* (2019.01)
  *H02M 7/00* (2006.01)
  *H02M 1/00* (2006.01)
  *H02J 7/00* (2006.01)

(52) U.S. Cl.
  CPC .............. *B60L 50/15* (2019.02); *H02P 21/20* (2016.02); *H02P 29/02* (2013.01); *B60L 2210/40* (2013.01); *H02J 7/00* (2013.01); *H02M 1/00* (2013.01); *H02M 7/00* (2013.01)

(58) Field of Classification Search
  CPC ...... H02J 7/02; H02J 7/007182; H02J 7/0025; H02J 7/0042; H02J 7/1423; H02J 7/345; H02J 9/061; H02J 7/00714; H02J 7/0045; H02J 7/0063; H02J 1/10; H02J 2207/40; H02J 7/00711; H02J 7/007; H02J 7/0036; H02J 1/082; H02J 2300/40; H02J 7/0027; H02J 7/14; H02J 2207/10; H02J 3/38; H02J 7/022; H02J 7/025; H02J 7/027; H02M 3/00; H02M 1/00; H02M 7/00; H02M 7/48
  USPC ........ 280/215, 216, 221, 223, 230; 307/2, 6, 307/8, 9.1, 10.1, 16, 18, 19, 20, 21, 22, 307/25, 26, 29, 37, 38, 43, 45, 54, 48, 57, 307/58, 56, 66, 80; 320/101, 116, 117, 320/118, 119, 120, 121, 122, 124, 125, 320/126, 140, 152, 151, 163, 165, 155, 320/109, 128, 106, 114, 132, 136, 137, 320/139, 150, 160; 323/906; 73/600, 73/861.75, 861.77; 363/13, 15, 17, 18, 363/19, 21.04–21.18, 113–14
  See application file for complete search history.

(56) References Cited

U.S. PATENT DOCUMENTS

2017/0346353 A1* 11/2017 Kitao .................... H02K 1/276
2020/0395878 A1* 12/2020 Takahashi ............ H02K 1/2786

* cited by examiner

POWER CONVERSION DEVICE AND MOTORIZED VEHICLE USING SAME

BACKGROUND OF THE INVENTION

1. Field of the Invention

The present disclosure relates to a power conversion device and a motorized vehicle using the same.

2. Description of the Background Art

Motorized vehicles such as electric vehicles and hybrid vehicles using a three-phase AC rotating machine (hereinafter, referred to as an AC motor under this title) as a driving force source, have been known. In such motorized vehicles, the AC motor is subjected to a power-running operation during traveling so as to generate travel driving torque, and is subjected to a regenerative operation during braking so as to generate regenerative braking torque.

Here, a drive system for motorized vehicles is composed of a DC power supply implemented by a secondary battery such as a lithium ion battery, a power conversion device connected to the DC power supply, and an AC motor connected as a load to the power conversion device.

The power conversion device includes a capacitor, a plurality of semiconductor switches, and control means for controlling the semiconductor switches. The power conversion device turns on or off the plurality of semiconductor switches at a predetermined switching frequency, thereby converting DC power of the DC power supply into AC power, whereby the torque and the rotation rate of the AC motor are adjusted. Depending on the operation state, the AC motor functions as a power generator and charges the DC power supply with regenerative power obtained by power generation.

When regenerative power from the AC motor is converted into DC voltage by the power conversion device and the DC voltage is used for charging the DC power supply, the AC motor may generate power that exceeds power receivable on the DC power supply side, thereby generating surplus power, whereby overvoltage may be generated in the motor drive system owing to the excessive regenerative power. Therefore, the consumption of regenerative energy in the AC motor needs to be increased as necessary so as to reduce regenerative power for the DC power supply side. Configurations have been known in which, for realizing such reduction, a current command value for high efficiency and a current command value for low efficiency are set and a consumption operation for consuming surplus power is arbitrarily set, with respect to the same torque command value (see, for example, Patent Document 1).

Patent Document 1: Japanese Laid-Open Patent Publication No. 2007-151336

In a power conversion device proposed in Patent Document 1, current command values need to be set for current command means in accordance with efficiency. In this case, a current command value for high efficiency and a current command value for low efficiency need to be set for the current command means on the basis of the same torque command value, and this causes a drawback in that the number of operation steps increases and the setting takes time.

SUMMARY OF THE INVENTION

An object of the present disclosure is to reduce the efficiencies of, and increase losses in, a power conversion device and a three-phase AC rotating machine while reducing the number of operation steps owing to unnecessity of presetting any current command value for a current command unit in accordance with efficiency.

A power conversion device according to the present disclosure is connected between a three-phase AC rotating machine and a DC power supply and configured to convert DC power into AC power, the power conversion device including:

a DC voltage value acquisition unit configured to output a DC voltage value of the DC power supply as a first DC voltage value;

a DC voltage value correction unit configured to output a second DC voltage value on the basis of the first DC voltage value and an efficiency index;

a current command unit configured to output a current command value on the basis of the second DC voltage value and a torque command value;

a current control unit configured to output a phase voltage command value on the basis of the current command value and a phase current value for the three-phase AC rotating machine; and a voltage application unit configured to, on the basis of the phase voltage command value, convert DC power of the DC power supply into AC power, and apply voltage to the three-phase AC rotating machine.

In the power conversion device according to the present disclosure, without setting any current command value for the current command unit in accordance with the efficiency index, the current command value is changed on the basis of the torque command value and the efficiency index, whereby the efficiencies of the power conversion device and the three-phase AC rotating machine can be controlled.

DETAILED DESCRIPTION OF THE PREFERRED EMBODIMENTS OF THE INVENTION

Figure 1:
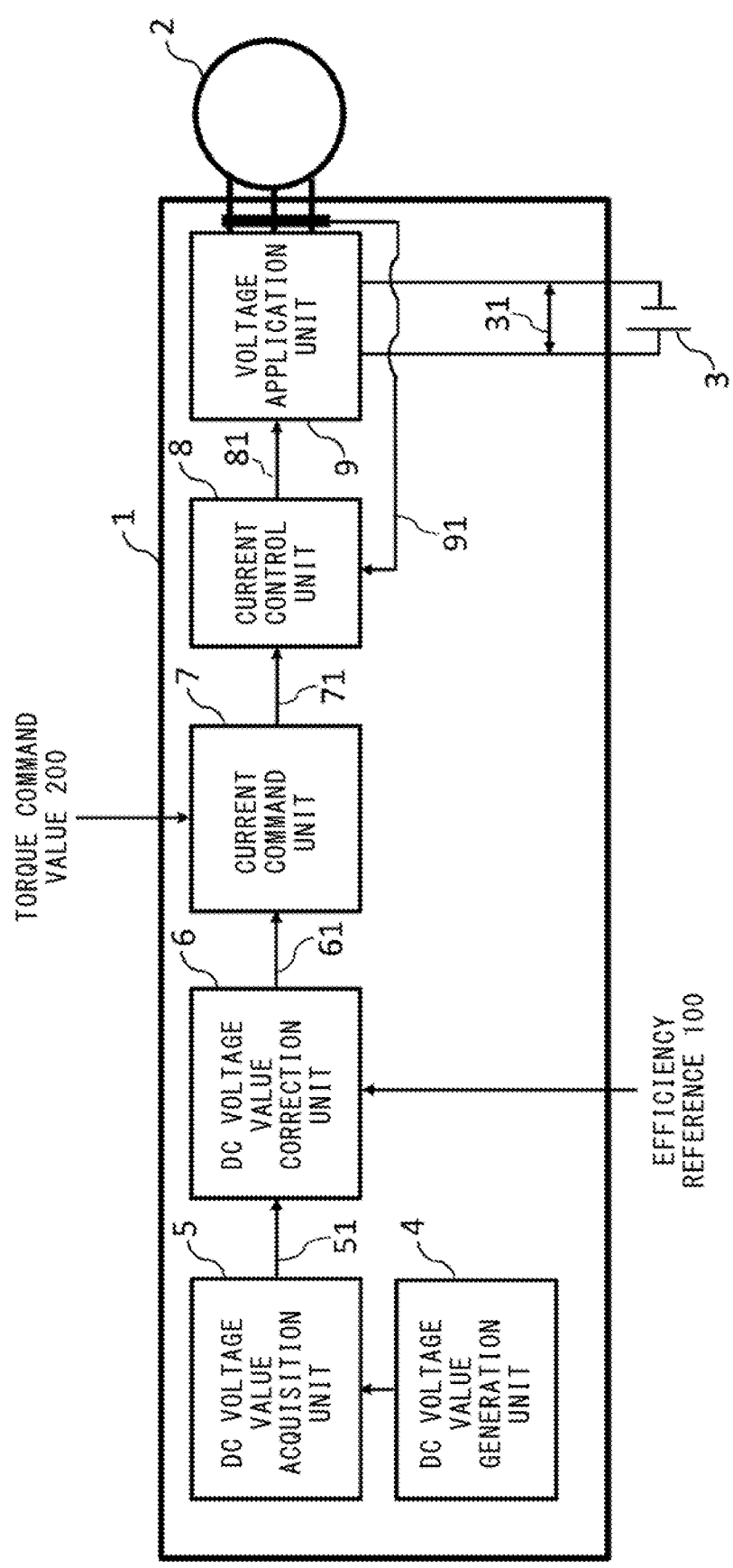
FIG. 1 is a schematic configuration diagram of a power conversion device and a three-phase AC rotating machine in a first embodiment.

Hereinafter, preferred embodiments of a power conversion device according to the present disclosure will be described with reference to the drawings. The same and corresponding terms are denoted by the same reference characters, and detailed description thereof will be omitted.

Also in the subsequent embodiments, repeated description of terms denoted by the same reference characters will be omitted in the same manner.

First Embodiment

FIG. 1 is a schematic configuration diagram of a power conversion device 1 according to a first embodiment, and a three-phase AC rotating machine 2 and a DC power supply 3 which are connected to the power conversion device 1.

The power conversion device 1 is composed of: a DC voltage value generation unit 4 which generates a DC voltage value of the DC power supply 3; a DC voltage value acquisition unit 5 which acquires the DC voltage value from the DC voltage value generation unit 4 and outputs a first DC voltage value 51; a DC voltage value correction unit 6 which corrects the first DC voltage value 51 to a second DC voltage value 61 on the basis of an externally obtained efficiency index 100; a current command unit 7 which outputs a current command value 71 on the basis of an externally obtained torque command value 200; a current control unit 8 which outputs a phase voltage command value 81 in accordance with the current command value 71 outputted from the current command unit 7 and a phase current value 91 to be inputted to the three-phase AC rotating machine 2; and a voltage application unit 9 which converts, into AC voltage, a DC voltage value 31 of the external DC power supply 3 by controlling switching elements, and applies the AC voltage to the three-phase AC rotating machine 2.

In the power conversion device 1 configured as described above, only such a current command value 71 that the efficiencies of the power conversion device 1 and the three-phase AC rotating machine 2 become highest is set for the current command unit 7 on the basis of the DC voltage value 31 and the torque command value 200, correction is performed in accordance with the efficiency index 100 so as to obtain only the second DC voltage value 61 that is to be inputted to the current command unit 7, and the current command value 71 is changed on the basis of the same torque command value 200.

In the configuration in FIG. 1, without presetting any current command value for the current command unit 7 in accordance with the efficiency index, the first DC voltage value 51 can be corrected to the second DC voltage value 61 on the basis of the efficiency index 100 by the DC voltage value correction unit 6 such that the current command value 71 to be outputted by the current command unit 7 is changed, whereby the efficiencies of the power conversion device 1 and the three-phase AC rotating machine 2 can be controlled.

Figure 2:
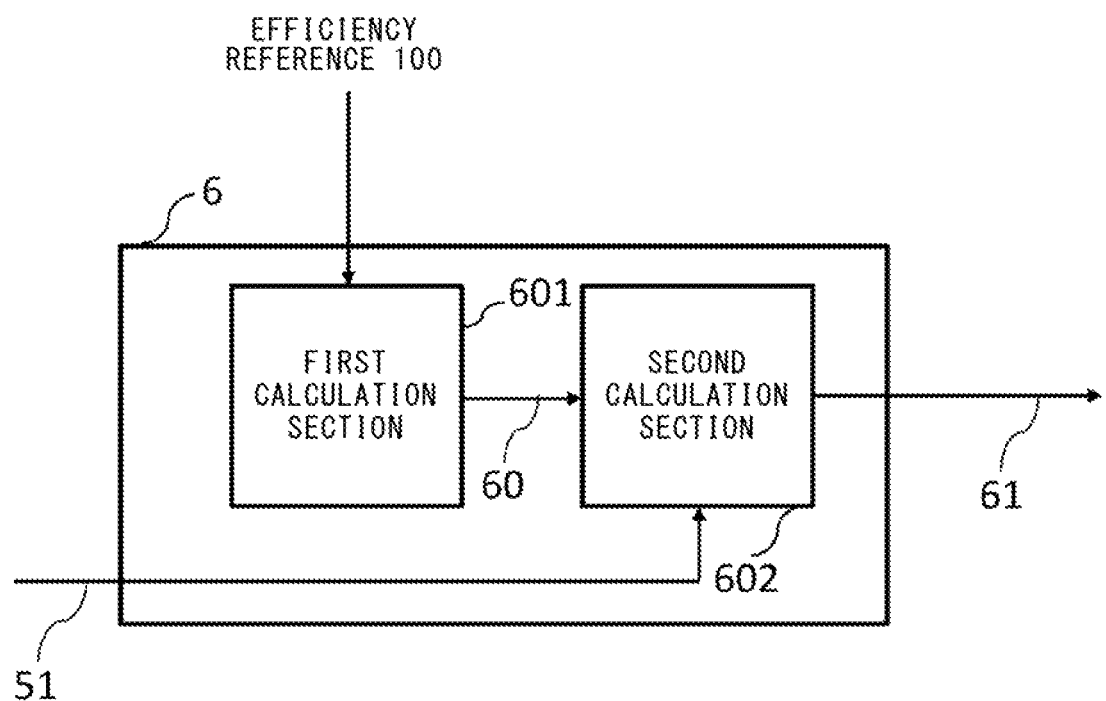
FIG. 2 is a schematic configuration diagram of a DC voltage value correction unit in the first embodiment.

FIG. 2 is a schematic configuration diagram of the DC voltage value correction unit 6. The DC voltage value correction unit 6 is composed of a first calculation section 601 which outputs a voltage correction value 60 on the basis of the efficiency index 100, and a second calculation section 602 which outputs the second DC voltage value 61 on the basis of the first DC voltage value 51 and the voltage correction value 60.

In the DC voltage value correction unit 6 configured as in FIG. 2, the first calculation section 601 outputs the voltage correction value 60 on the basis of the efficiency index 100, and the second calculation section 602 outputs the second DC voltage value 61 on the basis of the voltage correction value 60 and the first DC voltage value 51. Accordingly, in the configuration in FIG. 2, the first DC voltage value 51 can be easily corrected to the second DC voltage value 61 on the basis of the efficiency index 100.

Figure 3:
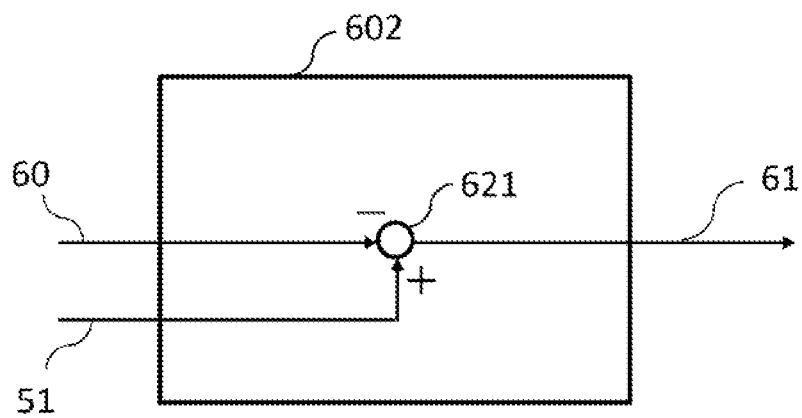
FIG. 3 is a schematic configuration diagram of a second calculation section in the first embodiment.

FIG. 3 is a schematic configuration diagram of the second calculation section 602. The second calculation section 602 is composed of a subtraction part 621 which performs subtraction between the first DC voltage value 51 and the voltage correction value 60, and outputs the second DC voltage value.

Figure 4:
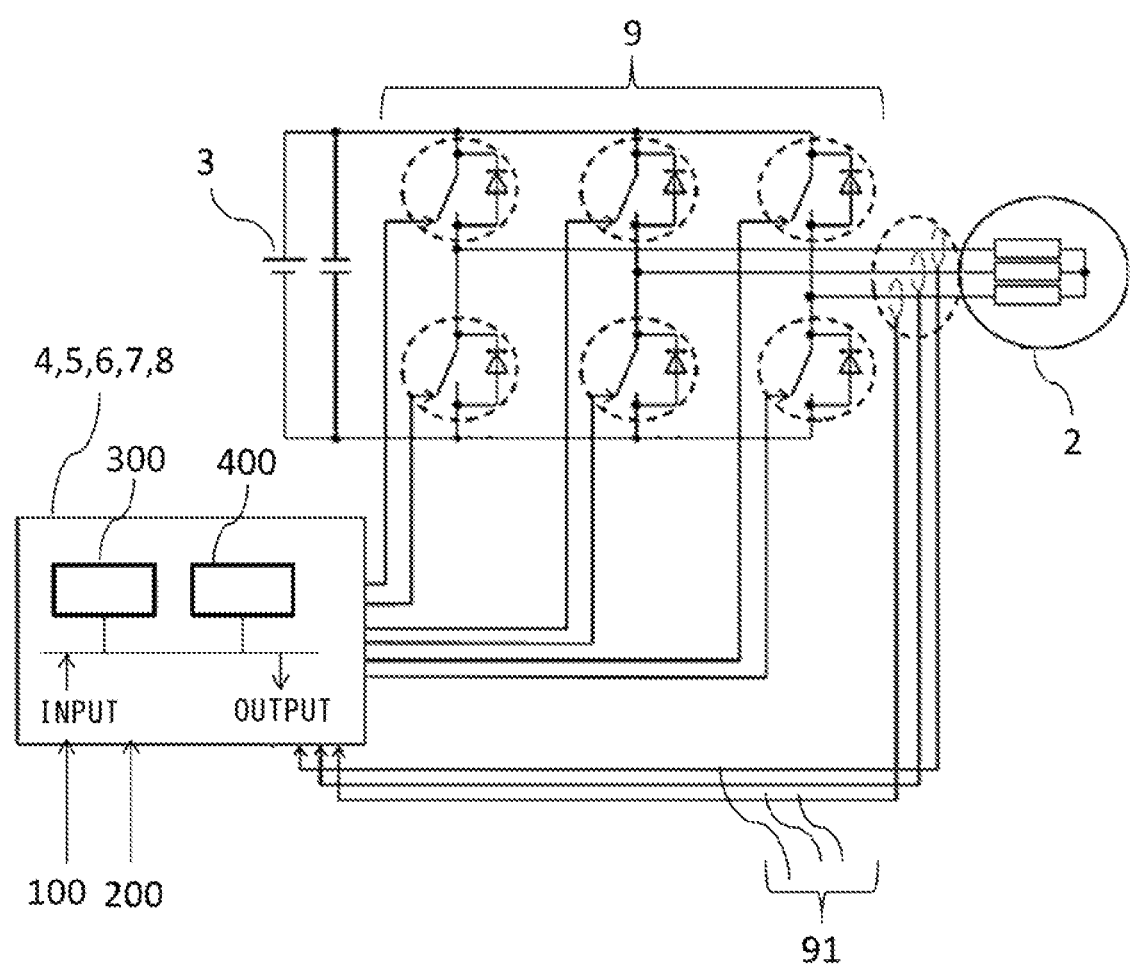
FIG. 4 is a hardware configuration diagram of the power conversion device in the first embodiment.

An example of hardware of the power conversion device is shown in FIG. 4. The hardware is composed of a processor 300 and a memory device 400. Although not shown, the memory device includes a volatile memory device such as a random access memory, and a nonvolatile auxiliary memory device such as a flash memory. Alternatively, the memory device may include, as the auxiliary memory device, a hard disk instead of a flash memory. The processor 300 executes a program inputted from the memory device 400 so that the current command value 71 is changed, whereby switching elements of the voltage application unit 9 are controlled. In this case, the program is inputted from the auxiliary memory device via the volatile memory device to the processor 300. In addition, the processor 300 may output data such as a calculation result to the volatile memory device of the memory device 400 or may save the data in the auxiliary memory device via the volatile memory device. In addition, the efficiency index 100 and the torque command value 200 may be inputted from outside or may be stored in the memory device 400. In addition, in cases of a small number of values to be switched such as a case where two values are used as the efficiency index 100 as described later, some units such as the DC voltage value correction unit 6 may be implemented by analog circuits or logical circuits.

Figure 5:
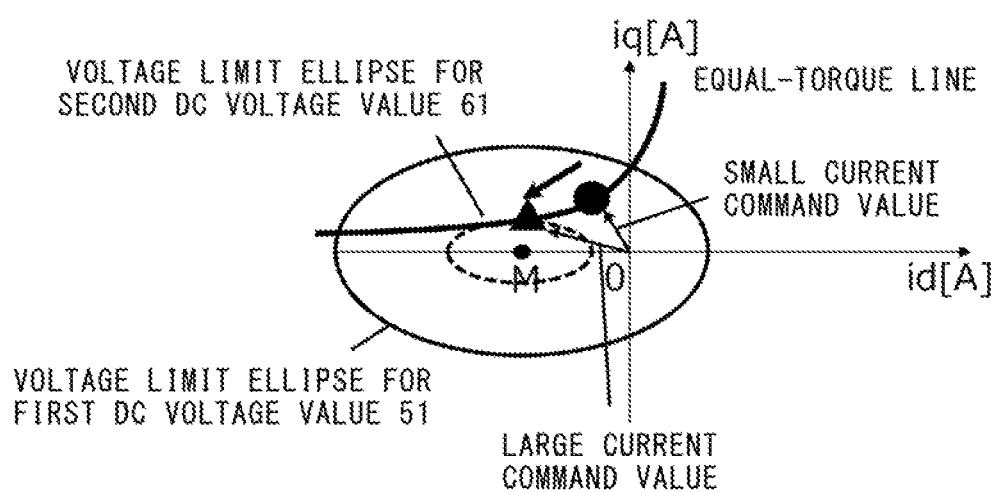
FIG. 5 is a diagram for explaining a change of a current operation point on an equal-torque line based on a voltage limit ellipse for a first DC voltage value and a voltage limit ellipse for a second DC voltage value in the first embodiment.

FIG. 5 is a diagram showing a change of a current operation point on an equal-torque curve when a voltage limit ellipse for the first DC voltage value 51 outputted by the DC voltage value acquisition unit 5 is corrected to a voltage limit ellipse for the second DC voltage value 61 outputted by the DC voltage value correction unit 6. Such a current command value that the efficiencies of the power conversion device 1 and the three-phase AC rotating machine 2 become highest, is set for the current command unit 7 in accordance with the second DC voltage value 61 and the torque command value 200. However, in the second calculation section 602 configured as in FIG. 2 and FIG. 3, the subtraction part 621 reduces the first DC voltage value 51 to the second DC voltage value 61 on the basis of the efficiency index 100. Accordingly, as shown in FIG. 5, the voltage limit ellipse for the second DC voltage value 61 becomes smaller than the voltage limit ellipse for the first DC voltage value 51, and thus the range within which the current operation point on the equal-torque curve can take values is narrowed, and the current operation point is changed. Consequently, the current command value that is set for the current command unit 7 increases with respect to the same torque command value.

Here, ON/OFF switching or an efficiency command value may be given as the efficiency index 100. In addition, for the first calculation section 601, a fixed value may be set or a value may be set with use of a table.

Hereinafter, the case where the ON/OFF switching is given as the efficiency index 100, will be described. If an output as the efficiency index 100 is OFF, the first calculation section 601 outputs "voltage correction value=0", and the first DC voltage value 51 and the second DC voltage value 61 become equal to each other. On the other hand, if the output as the efficiency index 100 is ON, the first calculation section 601 outputs "voltage correction value≠0".

Accordingly, as shown in FIG. 5, the second DC voltage value 61 becomes smaller than the first DC voltage value 51, and thus the current command value 71 that is outputted by the current command unit 7 changes with respect to the same torque command value 200, that is, on the equal-torque line. Consequently, the current command value is made variable.

If the efficiency command value is given as the efficiency index 100, the efficiency command value indicates a system efficiency (%) for which the power conversion device 1 and the three-phase AC rotating machine 2 are taken into account in combination. In accordance with the efficiency command value, the first calculation section 601 controls the DC voltage value to be inputted to the current command unit 7, thereby changing the voltage limit ellipse for the second DC voltage value 61 shown in FIG. 5. Accordingly, also if the efficiency command value is given as the efficiency index 100, the current command value 71 that is outputted by the current command unit 7 changes with respect to the same torque command value 200, that is, on the equal-torque line, as shown in FIG. 5. Consequently, the current command value is made variable.

Therefore, in the configuration in FIG. 1 to FIG. 4, without presetting any current command value in accordance with the efficiency, the current command value is changed on the basis of the torque command value and the efficiency index with a simple structure in which the DC voltage value to be inputted to the current command unit 7 is controlled, whereby the efficiencies of the power conversion device 1 and the three-phase AC rotating machine 2 can be controlled. Specifically, the first DC voltage value to be inputted to the current command unit 7 is reduced on the basis of the efficiency index such that the current command value to be outputted by the current command unit 7 increases, thereby being able to reduce the efficiencies of, and increase losses in, the power conversion device 1 and the three-phase AC rotating machine 2. If two values indicating ON and OFF are given as the above-described efficiency index 100, the number of operation steps becomes smaller and the configuration is more simplified. On the other hand, if the efficiency command value that takes two or more values is given as the efficiency index, more meticulous control is enabled.

Second Embodiment

In the above-described first embodiment, DC voltage of the DC power supply 3 is directly applied to the voltage application unit 9. However, DC voltage of the DC power supply 3 may be applied to the voltage application unit 9 via a step-up unit 11.

Figure 6:
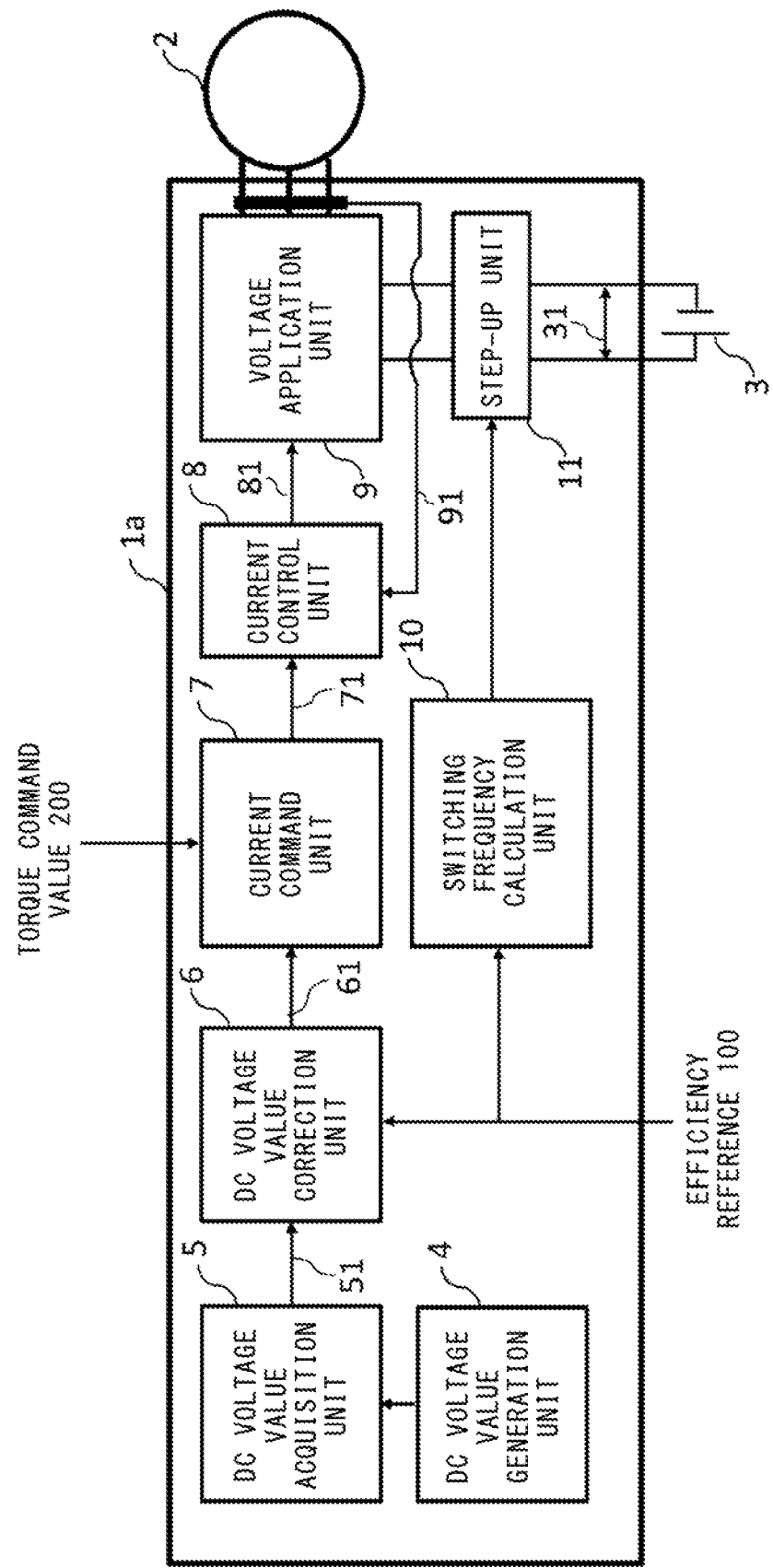
FIG. 6 is a schematic configuration diagram of a power conversion device and a three-phase AC rotating machine in a second embodiment.

FIG. 6 is a schematic configuration diagram of a power conversion device 1a in a second embodiment, the three-phase AC rotating machine 2, and the DC power supply 3. The power conversion device 1a is composed of: the DC voltage value generation unit 4 which generates a DC voltage value of the DC power supply 3; the DC voltage value acquisition unit 5 which acquires and outputs the first DC voltage value; the DC voltage value correction unit 6 which corrects the first DC voltage value 51 to the second DC voltage value 61 on the basis of the efficiency index 100; the current command unit 7 which outputs the current command value 71 on the basis of the torque command value 200; the current control unit 8 which outputs the phase voltage command value 81 on the basis of the current command value 71 and the phase current value 91; the voltage application unit 9 which converts the DC voltage value 31 of the DC power supply 3 into AC voltage and applies the AC voltage to the three-phase AC rotating machine 2; a switching frequency calculation unit 10 which outputs a switching frequency on the basis of the efficiency index 100; and the step-up unit 11 which increases the DC voltage value 31 of the DC power supply 3 on the basis of the switching frequency and applies the increased DC voltage value 31 to the voltage application unit 9.

In the power conversion device 1a configured as in FIG. 6, not only the current command value 71 described in the first embodiment but also the switching frequency for the step-up unit 11 are increased. Accordingly, the number of times of switching by the step-up unit 11 per unit time increases, whereby loss in the switching by the step-up unit 11 increases.

Therefore, in the configuration in FIG. 6, the efficiency of the step-up unit 11 can be reduced by increasing the switching frequency. Accordingly, the loss can be increased, and thus it is possible to further increase the loss in addition to increase in the current command value as in the above-described first embodiment. The configuration for calculating the switching frequency on the basis of the efficiency index 100 and controlling the step-up unit 11 may be implemented by the processor 300 executing a program inputted from the memory device 400, similar to the configuration shown in FIG. 4 of the first embodiment. The step-up unit 11 may be composed of a reactor and switching elements as is a step-up/down converter described in Patent Document 1.

In this manner, loss can be increased also in the step-up unit on the basis of the efficiency index, whereby the loss in the power conversion device can be further increased.

Third Embodiment

Figure 7:
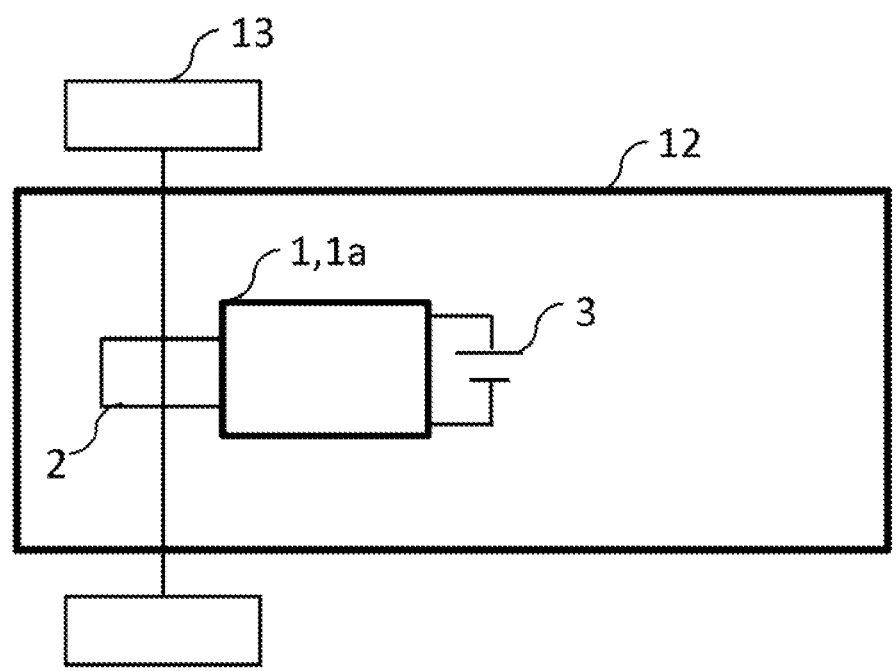
FIG. 7 is a schematic configuration diagram of a motorized vehicle in a third embodiment.

FIG. 7 is a schematic configuration diagram of a motorized vehicle 12. The motorized vehicle 12 is composed of drive wheels 13, the power conversion device 1 described in the first embodiment or the power conversion device 1a described in the second embodiment, the three-phase AC rotating machine 2, and the DC power supply 3.

The motorized vehicle 12 configured as in FIG. 7 allows reduction in the efficiencies of, and increase in losses in, the power conversion device 1 and the three-phase AC rotating machine 2, or the power conversion device 1a and the three-phase AC rotating machine 2. Accordingly, in the configuration in FIG. 7, when regenerative energy of the three-phase AC rotating machine 2 needs to be consumed, the losses in the three-phase AC rotating machine and the power conversion device are increased so that the rotation speed of the three-phase AC rotating machine 2 is prevented from increasing, whereby discomfort can be made less perceived by an occupant of the motorized vehicle.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 1a power conversion device
2 three-phase AC rotating machine
3 DC power supply
4 DC voltage value generation unit
5 DC voltage value acquisition unit
6 DC voltage value correction unit
7 current command unit
8 current control unit
9 voltage application unit
10 switching frequency calculation unit
11 step-up unit
12 motorized vehicle
13 drive wheel
300 processor
400 memory device
601 first calculation section
602 second calculation section

What is claimed is:

1. A power conversion device connected between a three-phase AC rotating machine and a DC power supply and configured to convert DC power into AC power, the power conversion device comprising:
a processor to execute a program; and
a memory to store the program which, when executed by the processor, results in performance of steps comprising:
outputting a DC voltage value of the DC power supply as a first DC voltage value;
outputting a second DC voltage value based on the first DC voltage value and an efficiency index, corresponding to a system efficiency, that corrects the first DC voltage value;
outputting a current command value based on the second DC voltage value and a constant torque command value;
outputting a phase voltage command value based on the current command value and a phase current value for the three-phase AC rotating machine; and
based on the phase voltage command value, converting DC power of the DC power supply into AC power, and apply voltage to the three-phase AC rotating machine,
wherein for outputting the second DC voltage value, a first calculator and a second calculator are included, the first calculator configured to output a voltage correction value based on the efficiency index; and the second calculator configured to output the second DC voltage value based on the first DC voltage value and the voltage correction value.

2. The power conversion device according to claim 1, wherein
a signal indicating ON or OFF is given as the efficiency index,
the voltage correction value is a fixed value, and,
when switching to ON or OFF is performed, the first DC voltage value is corrected based on the fixed value.

3. The power conversion device according to claim 1, wherein
a command value for the power conversion device and the three-phase AC rotating machine is given as the efficiency index, and
the first calculator outputs the voltage correction value in accordance with the command value.

4. The power conversion device according to claim 1, wherein
the second calculator includes a subtractor configured to output a difference between the first DC voltage value and the voltage correction value.

5. The power conversion device according to claim 2, wherein
the second calculator includes a subtractor configured to output a difference between the first DC voltage value and the voltage correction value.

6. The power conversion device according to claim 1, the power conversion device further comprising:
a switching frequency calculator configured to output a switching frequency based on the efficiency index; and
a step-upper configured to step up DC voltage of the DC power supply in accordance with the switching frequency and supply DC power obtained by the step-up to a voltage application device.

7. The power conversion device according to claim 2, the power conversion device further comprising:
a switching frequency calculator configured to output a switching frequency based on the efficiency index; and
a step-upper configured to step up DC voltage of the DC power supply in accordance with the switching frequency and supply DC power obtained by the step-up to a voltage application device.

8. The power conversion device according to claim 3, the power conversion device further comprising:
a switching frequency calculator configured to output a switching frequency based on the efficiency index; and
a step-upper configured to step up DC voltage of the DC power supply in accordance with the switching frequency and supply DC power obtained by the step-up to a voltage application device.

9. A motorized vehicle comprising:
the power conversion device according to claim 1; and
a drive wheel configured to be driven based on an output of the three-phase AC rotating machine.

* * * * *